Figure 1:
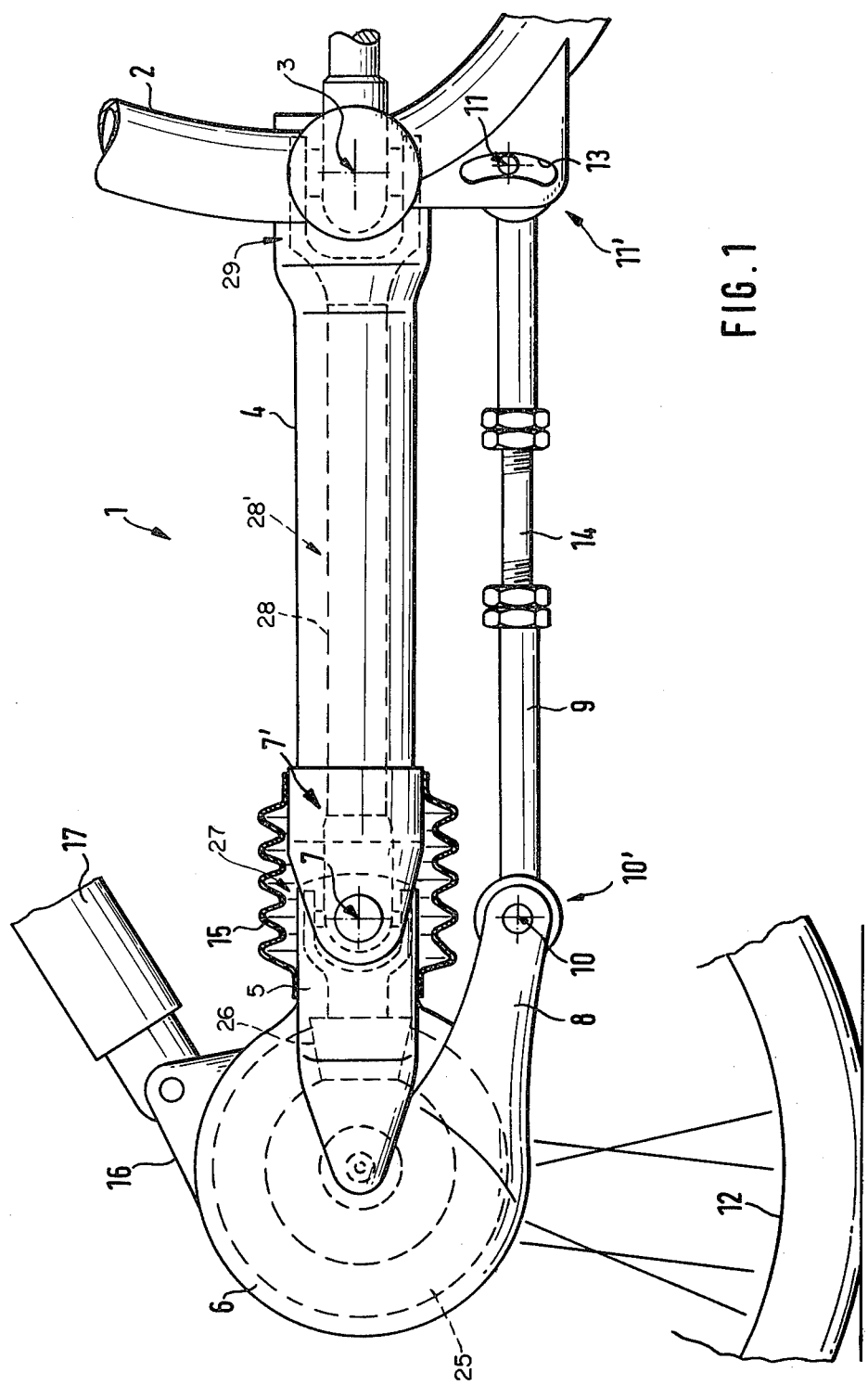

United States Patent [19]

Brenner et al.

[11] 4,434,868

[45] Mar. 6, 1984

[54] REAR WHEEL CONTROL UNIT FOR TWO-WHEELED VEHICLES WITH UNIVERSAL DRIVE MECHANISM

[75] Inventors: Horst Brenner, Gunding; Rene Hinsberg, Munich, both of Fed. Rep. of Germany

[73] Assignee: Bayerische Motoren Werke A.G., Munich, Fed. Rep. of Germany

[21] Appl. No.: 279,067

[22] Filed: Jun. 30, 1981

[30] Foreign Application Priority Data

Jul. 3, 1980 [DE] Fed. Rep. of Germany ... 8017869[U]

[51] Int. Cl.³ .................. B62K 25/20; B62M 17/00
[52] U.S. Cl. .................... 180/226; 180/227; 280/284
[58] Field of Search ............. 280/284, 283, 275, 276, 280/277, 96.3, 661, 285, 286; 180/226, 227, 219, 73 R, 228, 229, 230, 231

[56] References Cited

U.S. PATENT DOCUMENTS

| | | | |
|---|---|---|---|
| 2,077,628 | 4/1937 | Jordan | 180/227 X |
| 3,917,313 | 11/1975 | Smith et al. | 280/284 |
| 3,974,892 | 8/1976 | Bolger | 180/227 |
| 4,114,460 | 9/1978 | Oto | 280/283 X |
| 4,327,930 | 5/1982 | Tominaga et al. | 280/284 |
| 4,336,859 | 6/1982 | Leitner | 180/226 |

FOREIGN PATENT DOCUMENTS

| | | | |
|---|---|---|---|
| 173624 | 1/1953 | Austria | 180/227 |
| 43384 | 1/1982 | European Pat. Off. | 180/226 |
| 1055981 | 4/1959 | Fed. Rep. of Germany | 180/226 |

*Primary Examiner*—David M. Mitchell
*Assistant Examiner*—Mitchell J. Hill
*Attorney, Agent, or Firm*—Craig & Burns

[57] ABSTRACT

A rear wheel control unit for a two-wheeled vehicle with universal drive mechanism, such as a motorcycle, is disclosed. The rear wheel control unit comprises an axle housing for accommodating a drive unit of the universal drive mechanism of the two-wheeled vehicle in operative connection with the rear wheel of the vehicle. The axle housing has a connecting member for accommodating a shaft of the universal drive mechanism and is pivotably mounted to the frame of the two-wheeled vehicle by first and second wheel control arms arranged in a four-bar linkage. The first wheel control arm is formed as a one-armed oscillating lever articulated on the wheel side with the connecting member of the axle housing. The second wheel control arm serves as a moment support member.

6 Claims, 2 Drawing Figures

REAR WHEEL CONTROL UNIT FOR TWO-WHEELED VEHICLES WITH UNIVERSAL DRIVE MECHANISM

The present invention relates to a rear wheel control unit for a two-wheeled vehicle with universal drive mechanism such as a motorcycle of the type comprising an axle housing for the accommodation of the drive unit of the universal drive mechanism in operative connection with the rear wheel of the vehicle, the axle housing being pivotably mounted to the frame of the vehicle by way of wheel control arms arranged in a four-bar linkage with the axle housing having a connecting member for accommodating a shaft of the universal drive mechanism.

German Pat. No. 1,055,981 discloses a rear wheel control unit for a motorcycle with a two-armed oscillating lever wherein the axle housing is rotatably supported on the wheel axle. The axle housing, arranged to be rotationally movable with respect to the two-armed oscillating lever is supported on the frame of the motorcycle by way of a separate control arm. This control arm, supporting the acceleration and deceleration moments with respect to the frame constitutes together with the two-armed oscillating lever a four-bar linkage designed as a parallelogram.

Issue 15/1979 of the periodical "Motorrad" furthermore describes a rear wheel control unit for a motorcycle with universal drive mechanism wherein the axle housing is supported by way of four wheel control arms on the frame to provide reaction-free mounting, wherein respectively two wheel control arms of one vehicle side form a four-bar linkage designed as a parallelogram. In this rear wheel control arrangement, none of the articulations of the wheel control arms to the axle housing on the wheel side is congruent with the rear wheel axle. Accordingly, in this prior art arrangement, the axle housing exhibits on each vehicle side respectively two articulations for the wheel control arms, arranged at a spacing with respect to the rear wheel axle.

A further disadvantage of both of the aforementioned known arrangements of parallelogram rocker arm systems resides in the fact that the joints of the universal shaft in each lie open or exposed.

The encapsulation of the universal shaft by arranging the same in an oscillating tube of the rear wheel control unit has been known for two-armed as well as one-armed oscillating levers; attention is directed to the "Hagglund XM 72" described in issue 1/1973 of the periodical "Motorrad", as one example for such a one-armed oscillating lever. In the conventional two-armed and one-armed oscillating levers, the oscillating tube encapsulating the universal shaft is respectively fixedly joined to the axle housing, so that the acceleration and deceleration moments are supported on the frame of the two-wheeler by way of the one-armed oscillating lever as well as the two-armed oscillating lever. Thereby the known chassis reactions are encountered during operation of the motorcycle, namely the "bucking" and "diving" of the motorcycle above the rear wheel.

An object of the present invention is to provide a rear wheel control unit for a two-wheeled vehicle with universal drive mechanism of the aforementioned type wherein the above-referred to disadvantages associated with known arrangements are avoided.

A further object of the present invention is the provision of a rear wheel control unit for a two-wheeled vehicle with universal drive mechanism of the type referred to above having a universal shaft arranged in an encapsulated fashion, with an inexpensive structure.

These and other objects of the present invention are attained according to the present invention by providing a rear wheel control unit for a two-wheeled vehicle with universal drive mechanism of the type discussed above wherein a first wheel control arm is formed as a one-armed oscillating lever articulated on the wheel side with the connecting member associated with the axle housing and a second control arm serves as a moment support member.

The axle housing, articulated according to this invention to the one-armed oscillating lever and being separately supported on the frame of the two-wheeled vehicle yields, as compared with the state of the art described in the foregoing, a rear wheel control unit which is less expensive in its structure and comprising the known advantages of a reaction-free support, on the one hand, and a rapid wheel mounting by the one-armed oscillating lever, on the other hand.

According to further features of the invention means are provided for varying the length of the moment support member between its points of articulation and/or the moment support arm is arranged to be displaceable and lockable in a slotted hole oriented in one of its points of articulation at right angles to the one-armed oscillating lever. As a result of such features, the extent of chassis reactions can be determined as desired in an advantageous fashion. This is especially advantageous for motorcycle used on the road as well as in open terrain.

An additional feature of the present invention involves the provisions of means for covering the point of articulation of the one-armed oscillating lever at the connecting member, the means for covering tightly surrounding the connecting member and the one-armed oscillating lever on respective sides of the point of articulation. In a disclosed preferred embodiment of the invention the covering means is in the form of a bellows. This arrangement of the invention provides a complete encapsulation of the one-armed oscillating lever at the connecting member of the axle housing. This affords the advantage of an oil bath lubrication for the universal or differential joint arranged between the pinion shaft and the universal shaft. Bearings for the one-armed oscillating lever articulation, integrated within the connecting member, can thus be lubricated by way of the oil bath without any special expenditure in structural parts.

According to a still further feature of one disclosed embodiment of the invention, the axle housing, has an eye for connecting a shock absorber such as a spring or damper unit and an arm for the connection of the moment support member to the axle housing. By using such a construction of the axle housing, lower stresses from the wheel loads are achieved for the connecting member.

In a second embodiment of the invention the connecting member is arranged separately at the axle housing and is equipped with brackets for connecting a shock absorber and the moment support member to the axle housing. A connecting member constructed in this manner offers the advantage when converting an existing rear wheel control unit to one according to the present invention, the axle housing can remain in the existing arrangement without any structural modifications.

Figure 2:
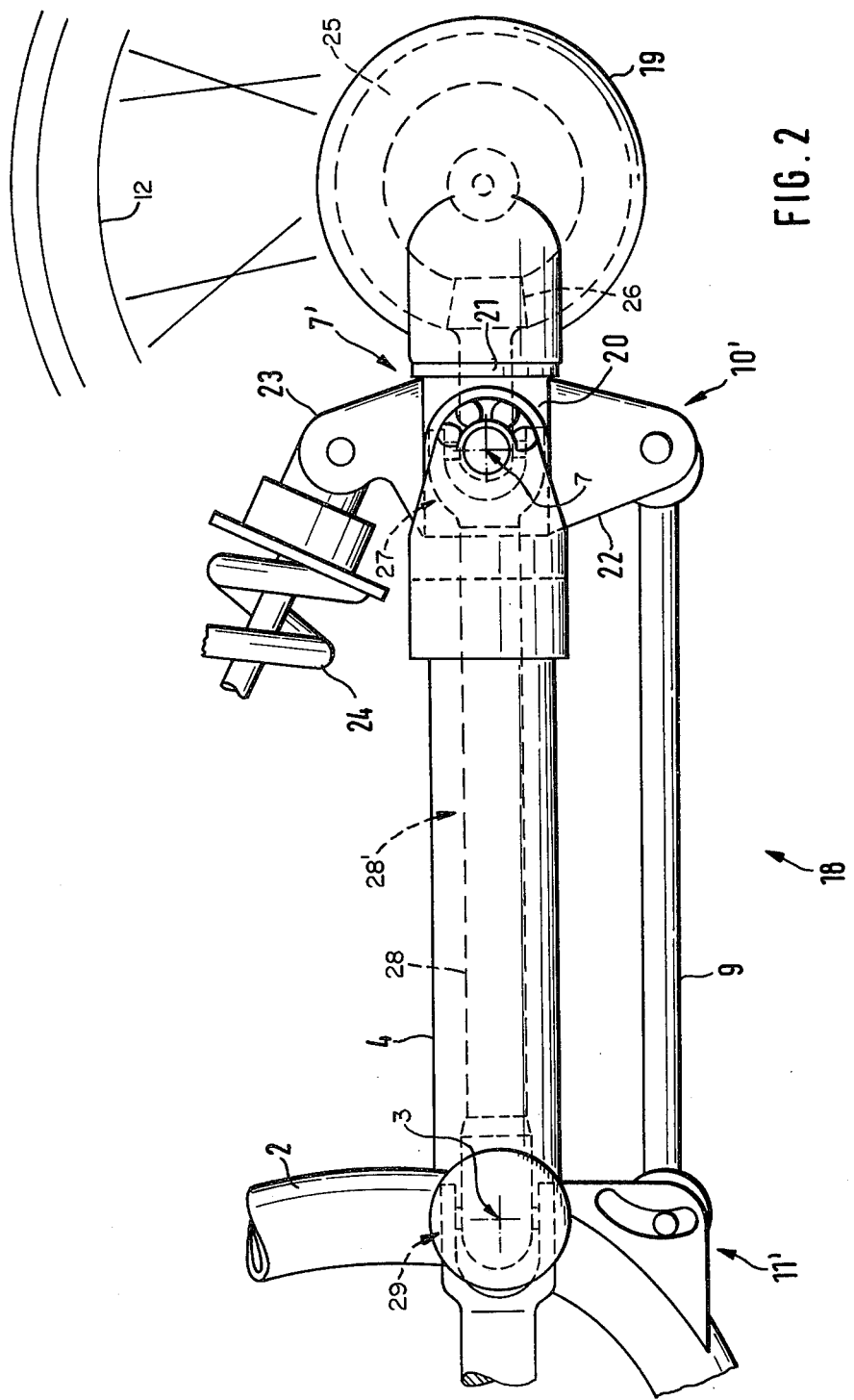

These and other objects, features and advantages of the present invention will become more apparent from the following description when taken in connection with the accompanying drawings which show, for purposes of illustration only, two embodiments in accordance with the present invention, and wherein:

FIG. 1 is a side elevational view of a first embodiment of a rear axle control unit of the invention with a connecting member cast integrally with the axle housing; and FIG. 2 is a side elevational view of a second embodiment of a rear wheel control unit according to the invention with a connecting member threadedly joined to the axle housing.

Referring now to the drawings wherein like reference numerals are used in the several views to designate like parts and more particularly to FIG. 1, a rear wheel control unit 1 for a motorcycle with universal drive mechanism 28' comprises a one-armed oscillating lever 4 mounted to be pivotably movable about the axis 3 to the frame 2. The one-armed oscillating lever 4 is articulated on the wheel side with a connecting member 5 of an axle housing 6 accommodating the drive unit of ring gear 25/pinion 26 of the universal drive mechanism 28', including a universal shaft and universal joint, this articulation being about the axis 7. The axle housing 6 comprises an arm 8 for the hinged coupling with a moment or torque support member 9 about the axis 10. The moment support member 9 is rotatably mounted about the axis 11 on the frame 2. All pivoting axes 3, 7, 10, and 11 extend through the corner points of a four-bar linkage which forms a parallelogram with a reaction-free support of the axle housing 6, in operative connection with the rear wheel 12, at the frame 2.

Depending on the purpose for which the motorcycle is used, on the road and/or cross-country, a certain residual bucking or rearing up moment may be desirable in the rear wheel control unit 1. For this purpose, the moment support member 9 is arranged in its point of articulation 11' within a slotted hole 13 oriented at right angles to the one-armed oscillating lever 4, so that the support member can be displaced and locked in place therein. Alternatively or additionally, the moment support member 9 is fashioned to be variable in its length between the points of articulation 10' and 11' by means of a device comprising a threaded spindle 14.

It can furthermore be seen from FIG. 1 that the point of articulation 7' of the one-armed oscillating lever 4 is covered at the connecting member 5 of the axle housing 6 by means of a bellows 15. To permit the universal shaft 28, which is encapsulated with its universal joints 27 and 29 within the one-armed oscillating lever 4, to run in an oil bath, the bellows 15 exhibits on both sides of the point of articulation 7' end sections which tightly enclose the connecting member 5 as well as the one-armed oscillating lever 4.

Furthermore, FIG. 1 shows that the axle housing 6 has an eye or bracket 16 for the connection of shock absorber in the form of a spring damper unit 17.

The rear wheel control unit 18 in FIG. 2, as compared with the rear wheel control unit 1 shown in FIG. 1, has a connecting member 20 separately arranged at the axle housing 19. The connecting member 20 is threaded to the axle housing 19 via a flange 21. To connect the moment support member 9, a bracket 22 is arranged at the connecting member 20. Finally, the connecting member 20 is equipped with a bracket 23 to connect a shock absorber in the form of a spring damper unit 24. By means of the connecting member 20, an axle housing 19, heretofore threaded to a one-armed oscillating lever, can be further utilized without constructional modification for the rear wheel control unit 18 fashioned in accordance with this invention.

While we have shown and described only two embodiments in accordance with the present invention, it is understood that the same is not limited thereto but is suceptible of numerous changes and modifications as known to those skilled in the art, and we therefore do not wish to be limited to the details shown and described herein but intend to cover all such changes and modifications as are encompassed by the scope of the appended claims.

We claim:

1. A rear-wheel control for two-wheel vehicles, especially a motorcycle, comprising a driven wheel controlled by a one-armed oscillating lever pivoted at the frame and connected to a gear wheel and pinion of a ring/gear pinion gearing so that the driven wheel is fixed with respect to rotation, the gear wheel and the pinion being disposed in an axle housing relative to the one-armed oscillating lever by means of an arm and a moment support flexibly connected to said arm and the frame, said housing adapted to be pivoted, the pinion being disposed so that said pinion is aligned with the one-armed oscillating lever at the connecting member of the housing, said pinion being connected to a universal shaft arranged in said lever, said universal shaft, in the area of the pivot point of said lever at the frame, being provided universal joint means and the lever is also flexibly connected to the housing.

2. A rear wheel control unit according to claim 1, wherein means are provided for covering the point of articulation of the one-armed oscillating lever at the connecting member of the axle housing means, said means for covering is a bellows.

3. A rear wheel control unit according to claim 1, wherein said axle housing has a bracket for connecting a shock absorber means thereto and an arm for the connection of the moment support member to said axle housing.

4. A rear wheel control unit according to claim 1, wherein the connecting member is arranged separately at the axle housing and is equipped with brackets for connecting a shock absorber means and the moment support member to said axle housing.

5. The rear-wheel control according to claim 1, wherein the housing has a connecting member and said connecting member is connected to said lever, and means being provided for the tight covering of the pivoting point which tightly enclose the connecting member and said lever.

6. A rear-wheel control for two-wheel vehicles, especially a motorcycle comprising a driven wheel being controlled by a one-armed oscillating lever pivoted at the frame and connected to a gear wheel and pinion of a ring gear/pinion gearing so that the driven wheel is fixed with respect to rotation, the gear wheel and the pinion being disposed in a housing relative to said oscillating lever by means of an arm and a moment support that is flexibly connected to said arm and said frame, said housing adapted to be pivoted, the pinion being disposed so that said pinion is aligned with the oscillating lever at the connecting member of the housing, said pinion being connected to a universal shaft arranged in said lever, said universal shaft, in the area of the pivot point of said lever at the frame, being provided universal joints means, the lever being connected with the housing and that a moment support member is arranged in its pivot point within a slotted oblong hole, and the moment support member adapted to be transversely moveable with respect to said lever so that said moment support member is movable and lockable in said slotted oblong hole, and said moment support member can be variable in its length between the pivoting points.

* * * * *